(12) United States Patent
Danilov et al.

(10) Patent No.: US 10,732,839 B2
(45) Date of Patent: Aug. 4, 2020

(54) SCALE-OUT STORAGE SYSTEM REBALANCING

(71) Applicant: EMC IP Holding Company LLC, Hopkinton, MA (US)

(72) Inventors: Mikhail Danilov, Saint Petersburg (RU); Vladislav Eremeev, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 175 days.

(21) Appl. No.: 16/053,758

(22) Filed: Aug. 2, 2018

(65) Prior Publication Data

US 2020/0042178 A1     Feb. 6, 2020

(51) Int. Cl.
*G06F 3/06* (2006.01)

(52) U.S. Cl.
CPC ............ *G06F 3/0604* (2013.01); *G06F 3/067* (2013.01); *G06F 3/0638* (2013.01)

(58) Field of Classification Search
None
See application file for complete search history.

(56) References Cited

U.S. PATENT DOCUMENTS

| 2010/0094958 | A1* | 4/2010 | Zuckerman | ......... H04L 67/1097 709/219 |
| 2017/0371571 | A1* | 12/2017 | Danilov | .................. G06F 3/067 |
| 2018/0004414 | A1* | 1/2018 | Danilov | .................. G06F 3/061 |

* cited by examiner

*Primary Examiner* — Ryan Bertram
*Assistant Examiner* — Trang K Ta
(74) *Attorney, Agent, or Firm* — Amin, Turocy & Watson, LLP

(57) ABSTRACT

A universal mechanism is utilized for data rebalancing in a scaled-out data storage cluster. A value (l) representing a number of erasure coded fragments of each data portion that are to be moved to a newly added node can be calculated. Initially, the number of erasure coded fragments moved per data fragment is determined based on the greatest integer that is less than or equal to l and remainders are accumulated. When accumulated reminders equal or exceed 1, the number of erasure coded fragments moved per data fragment is determined based on the lowest integer that is greater than or equal to l. A value of accumulated reminders is then decreased by 1. Accordingly, system-level imbalances can be avoided and data availability, data robustness, and/or overall system performance can be increased.

20 Claims, 13 Drawing Sheets

US 10,732,839 B2

SCALE-OUT STORAGE SYSTEM REBALANCING

TECHNICAL FIELD

The subject disclosure relates generally to a system and method for scale-out storage system rebalancing.

BACKGROUND

The large increase in amount of data generated by digital systems has created a new set of challenges for data storage environments. Traditional storage area network (SAN) and/or network-attached storage (NAS) architectures have not been designed to support data storage or protection at large multi-petabyte capacity levels. Object storage technology can be utilized to meet these requirements. With object storage technology, organizations can not only keep up with rising capacity levels, but can also store these new capacity levels at a manageable cost point.

Typically, a scale-out, cluster-based, shared-nothing object storage that employs a microservices architecture pattern, for example, an Elastic Cloud Storage (ECS™) can be utilized as a storage environment for a new generation of workloads. ECS™ is a cloud-based object storage appliance, wherein the storage control software and the physical magnetic disk media are combined as an integrated system with no access to the storage media other than through the ECS™. ECS™ is an append-only virtual storage platform that protects content from being erased or overwritten for a specified retention period. ECS™ does not employ traditional data protection schemes like mirroring or parity protection. Instead, ECS™ utilizes erasure coding for data protection, wherein a data chunk is broken into fragments, expanded, and encoded with redundant data pieces and then stored across a set of different locations or storage media.

The above-described background relating to storage systems is merely intended to provide a contextual overview of some current issues, and is not intended to be exhaustive. Other contextual information may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Example systems and methods disclosed herein relate to universal data rebalancing in a scale-out/scale-up cloud-based object storage systems. In one example embodiment, a system is disclosed that comprises a processor and a memory that stores executable instructions that, when executed by the processor, facilitate performance of operations. Moreover, the operations comprise determining that a data storage cluster comprising a first set of nodes is expanded by addition of a second set of nodes, wherein the first set of nodes stores erasure-coded fragments associated with chunks, and determining a non-integer value representing a portion of the erasure-coded fragments per chunk that are to be transferred from the first set of nodes to the second set of nodes. Further, the operations comprise facilitating a transfer of a first set of the erasure-coded fragments per chunk from the first set of nodes to the second set of nodes, wherein the first set of the erasure-coded fragments is determined to satisfy a defined floor criterion associated with the non-integer value, and subsequent to the facilitating, determining an aggregated remainder based on combining remainder values per chunk, wherein the remainder values that have been determined based on subtracting a cardinality of the first set from the non-integer value. In addition, the operations comprise in response to determining that the aggregated remainder satisfies a defined remainder criterion, facilitating a transmission of a second set of the erasure-coded fragments per chunk from the first set of nodes to the second set of nodes, wherein the second set of the erasure-coded fragments is determined to satisfy a defined ceiling criterion associated with the non-integer value.

Another example embodiment of the specification relates to a method that comprises subsequent to a first group of nodes being added to a data storage cluster comprising a second group of nodes that stores erasure-coded fragments associated with chunks, determining, by a system comprising a processor, a non-integer value representing the erasure-coded fragments that are to be transferred from the second group of nodes to the first group of nodes per chunk, and based on applying a floor function to the non-integer value, determining, by the system, a first number of the erasure-coded fragments of a first group of the chunks that are to be transferred from the second group of nodes to the first group of nodes. According to an aspect, the method further comprises accumulating, by the system, remainder values associated with the first group of the chunks, wherein the remainder values have been determined based on subtracting the first number from the non-integer value, and wherein the accumulating results in an accumulated remainder value, and in response to determining that the accumulated remainder value satisfies a defined remainder criterion, determining, by the system, a second number of the erasure-coded fragments of a second group of the chunks that are to be transferred from the second group of nodes to the first group of nodes, wherein the second number is determined based on applying a ceiling function to the non-integer value.

Another example embodiment of the specification relates to a computer-readable storage medium comprising instructions that, in response to execution, cause a system comprising a processor to perform operations, comprising subsequent to a first group of nodes being added to a data storage cluster comprising a second group of nodes that stores erasure-coded fragments associated with chunks, determining a value associated with the erasure-coded fragments that are to be transferred from the second group of nodes to the first group of nodes per chunk; in response to determining that the value is not an integer value, determining, based on applying a floor function to the value, a first number of the erasure-coded fragments of a first group of the chunks that are to be transferred from the second group of nodes to the first group of nodes; aggregating remainder values associated with the first group of the chunks to generate an aggregated remainder value, wherein the remainder values are determined based on reducing the value by the first number; and in response to determining that the aggregated remaindervalue satisfies a defined remainder criterion, determining a second number of the erasure-coded fragments of a second group of the chunks that are to be transferred from the second group of nodes to the first group of nodes, wherein the second number is determined based on applying a ceiling function to the value.

The following description and the drawings set forth certain illustrative aspects of the specification. These aspects are indicative a few of the various ways in which the principles of the specification may be employed. Other advantages and novel features of the specification will become apparent from the detailed description of the specification when considered in conjunction with the drawings.

DETAILED DESCRIPTION

Figure 1:
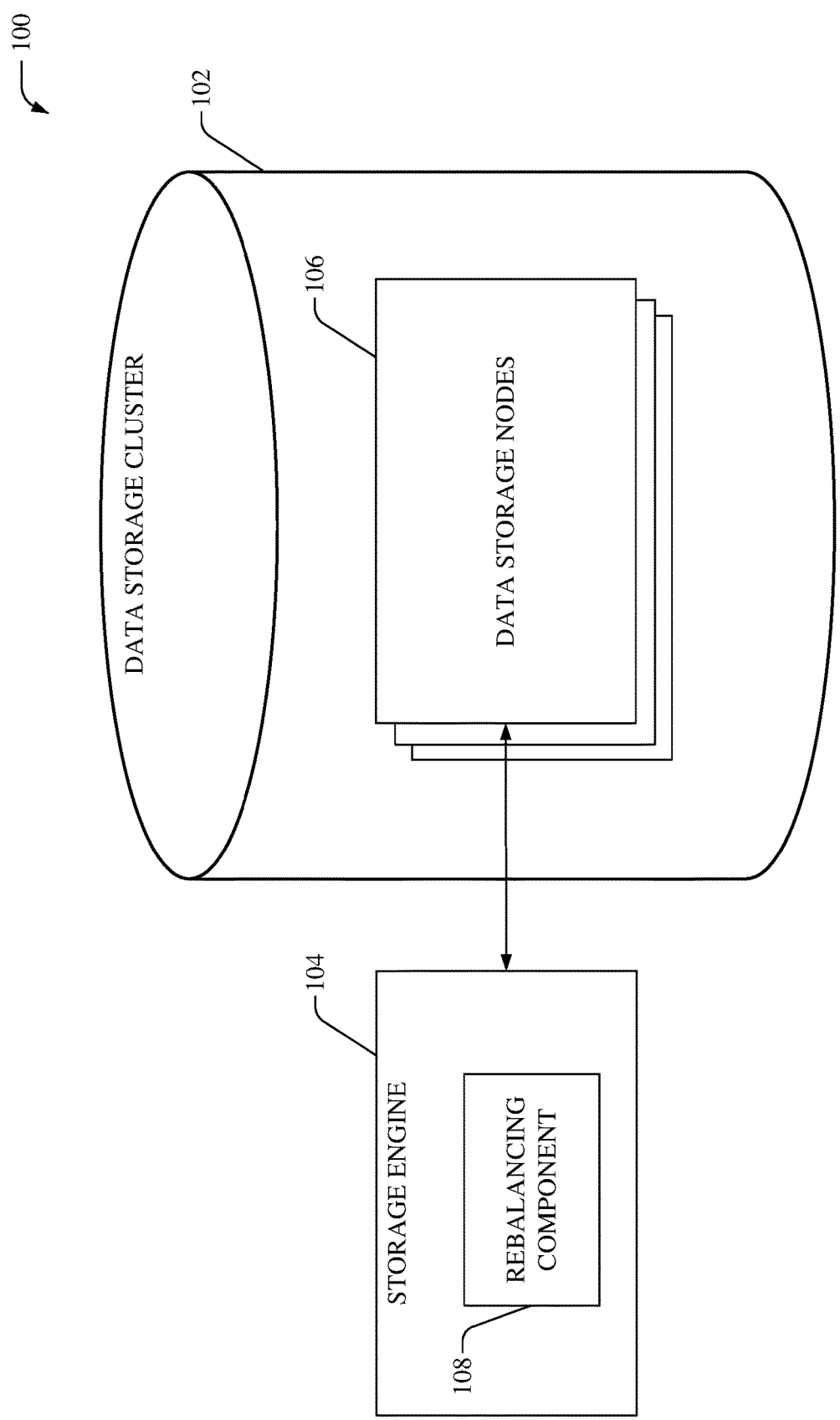
FIG. 1 illustrates an example system that that facilitates efficient data rebalancing during expansion of a distributed cloud storage system.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used herein, the term "cloud" can refer to a cluster, data storage cluster, etc. comprising a group of nodes, data storage nodes, etc., e.g., comprising a group of network servers (e.g., comprising storage devices, disk drives, etc.), within a distributed, e.g., globally distributed, storage system—the group of storage nodes being communicatively and/or operatively coupled to each other, and hosting a group of applications utilized for servicing user requests. In general, the storage nodes can communicate with user devices via wired and/or wireless communication network(s) to provide access to services that are based in the cloud and not stored locally, e.g., on a user device. A typical cloud-computing environment can comprise multiple layers, aggregated together, which interact with each other to provide resources for end-users.

Example systems and methods disclosed herein, in one or more embodiments, relate to a scale-out, cluster-based, shared-nothing object storage system that employs a microservices architecture pattern, for example, an Elastic Cloud Storage (ECS™) system that can combine the cost advantages of commodity infrastructure with the reliability, availability and serviceability of traditional arrays. In one aspect, the ECS™ platform can comprise a cluster of nodes (also referred to as "cluster" herein) that delivers scalable and simple public cloud services with the reliability and/or control of a private-cloud infrastructure. Moreover, the platform can support storage, manipulation, and/or analysis of unstructured data on a massive scale on commodity hardware. As an example, ECS™ can support mobile, cloud, big data, and/or social networking applications. ECS™ can be deployed as a turnkey storage appliance or as a software product that can be installed on a set of qualified commodity servers and disks. The ECS™ scale-out, geo-distributed architecture is a cloud platform that can provide at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

ECS™ employs a specific method for disk capacity management. ECS™ does not rely on a file system. Instead, all disk space in the ECS™ is partitioned into a set of blocks of fixed size (e.g., 128 MB) called chunks. User data is stored in these chunks and the chunks can be shared. In an example, one chunk can comprise data fragments of different user objects. Chunk content can be modified in an append-only mode. When a chunk becomes full enough, it is sealed. Content of sealed chunks is immutable.

In one aspect, the systems and methods disclosed herein relate to improving data rebalancing after a cluster size is changed (e.g., by adding or removing nodes). For example, when a cluster scales out (e.g., additional nodes added to a cluster), it can be beneficial to change layout of existing data, for example, to improve data availability and/or robustness. This procedure of changing the layout (e.g., moving data between old and new nodes) is known as rebalancing. Typically, during rebalancing, a portion of data and coding fragments are moved from the old nodes to the new nodes. With the new layout each node can then comprise the same (and/or almost the same) number of fragments. Efficient rebalancing disclosed herein can provide at least the following advantages: (i) change of layout improves data availability/robustness. For example, with the new layout, the system can survive loss of more nodes without data loss as compared to the original layout; (ii) change of layout increases overall system performance. For example, with the original layout, majority of writes requests (sometimes all) fall on the new nodes because they have more available capacity. However, with the new layout, all the nodes can accept the same (or almost the same) amount of new data. This can increase overall system bandwidth and/or throughput.

In one aspect the ECS™ can implement a basic mechanism for rebalancing that works at the data portion level as follows. A basic proportion (e.g., a ratio of total number of fragments to total number of nodes) can be utilized to calculate a number of fragments that are to be stored within each node and accordingly, fragments can be moved to new nodes. In particular, a layout of free capacity blocks can be requested for data and/or coding fragments to move. An exact set of data/coding fragments to move can be identified. Further, prior to moving the data, the basic mechanism of rebalancing compares the new potential layout to the old layout to verify that a maximum number of fragments per node reduces with the transition to the new layout. Only if verified that the maximum number is reduced via the new layout then the data/coding fragments, to be moved, are moved to the new nodes; otherwise, the original layout is maintained. However, this basic mechanism is not universal. For example, the basic mechanism works at the data portion level so it can provide unsatisfactory results at the system level (e.g., if 100 nodes are added to a 100-node cluster, rebalancing is not performed since the number of fragments per node, calculated with the basic proportion, does not change with the new layout); the basic mechanism does not work when a number of old nodes is significantly greater than a number of new nodes or vice versa (e.g., in this case, a basic proportion gives 0 or k+m fragments to move for a given data portion); and/or the basic mechanism is based on an assumption that there is no need to perform rebalancing if maximal number of fragments per node does not reduce with a transition to the new layout. Therefore, the only goal of the basic mechanism is improvement of data availability/robustness and the mechanism cannot be used to increase overall system performance.

Systems and methods disclosed herein provide a more universal mechanism for data rebalancing that avoids the above-mentioned problems of the basic mechanism in scale-out storage systems. Although the systems and methods disclosed herein have been described with respect to object storage systems (e.g., ECS™), it is noted that the subject specification is not limited to object storage systems and can be utilized for most any scale-out and/or scale-up storage systems that utilize erasure coding for data protection (e.g., file storage systems).

Referring initially to FIG. 1, there illustrated is an example system 100 that facilitates efficient data rebalancing during expansion of a distributed cloud storage system, according to one or more aspects of the disclosed subject matter. In one aspect, system 100 can facilitate data rebalancing that can be performed when a data storage cluster 102 is scaled-out (e.g., additional nodes are added to the cluster) to improve data availability/robustness and overall system performance. Moreover, system 100 provides a universal mechanism for rebalancing that assures satisfactory results (e.g., a balanced layout with optimal number of fragments within each node) for clusters of any size and/or for clusters having any ratio of number of old nodes to number of new nodes.

Typically, the system 100 can utilize a storage service layer to handle data availability and protection against data corruption, hardware failures, and/or data center disasters. A storage engine 104 can be a part of the storage services layer. As an example, the storage engine 104 can be a distributed shared service that runs on each node (e.g., data storage nodes 106) and can manage transactions and persists data to the nodes. According to an aspect, the storage engine 104 can write all object-related data (such as, user data, metadata, and/or object location data) to logical containers of contiguous disk space known as chunks. Chunks are open and accepting writes, or closed and not accepting writes. After chunks are closed, the storage engine 104 erasure-codes the chunks (e.g., to generate and store data and coding fragments based on the erasure coding configuration).

During erasure coding, the storage engine 104 can utilize a k+m protection configuration, wherein k represents the number of data fragments (wherein k can be most any integer) of a chunk and m represents the number of coding fragments (wherein m can be most any integer) generated for the chunk. In one aspect, the storage engine 104 can encode the k data fragments to generate m coding fragments. Moreover, the fragments are encoded in a manner such that the system can tolerate the loss of any m fragments. The m coding fragments can then be stored within different nodes 106.

According to an embodiment, the data storage cluster 102 can comprise N1 data storage nodes 104 (e.g., wherein N1 is most any integer). As described above, the data storage cluster 102 can utilize a k+m erasure coding protection configuration to generate data and coding fragments for a data portion (e.g., chunk). In this example scenario, a layout of data and coding fragments for a given data portion is determined to be optimal if each of the data storage nodes 106 stores a number of fragments in the range [floor1, ceil1], wherein $$\text{floor1} = \lfloor (k+m)/N1 \rfloor \quad (1)$$

and $$\text{ceil1} = \lceil (k+m)/N1 \rceil \quad (2)$$

It is noted that a number of nodes with ceil1 fragments are not to exceed the value $N1 - \lfloor N1/\text{ceil1} \rfloor * \text{ceil1}$. Further, the difference between floor1 and ceil1 cannot exceed 1 and sometimes floor1 can equal ceil1. For example, each node of a 5-node cluster can comprise a number of fragments of a given data portion from the range [3, 4], each node of an 8-node cluster can comprise a number of fragments of a given data portion from the range [2, 2], and each node of a 17-node cluster can comprise a number of fragments of a given data portion from the range [0, 1], so on and so forth.

According to an aspect, after the data storage cluster 102 is expanded with n new nodes, it can comprise N2 (N2=N1+n; wherein n is most any integer) data storage nodes 106. In this example scenario, the new range for fragments stored within a data storage node 106 can be [floor2, ceil2], wherein $$\text{floor2} = \lfloor (k+m)/N2 \rfloor \quad (3)$$

and $$\text{ceil2} = \lceil (k+m)/N2 \rceil \quad (4)$$

It is noted that the floor function (e.g., floor1, floor2, etc.) described herein comprises a function that takes as input a real number and gives as output the greatest integer less than or equal to the real number. Similarly, the ceiling function (e.g., ceil1, ceil2, etc.) described herein comprises a function that takes as input a real number and gives as output the least integer greater than or equal to the real number.

In some example scenarios, the new range can be the same as the old range. Even in these example scenarios, rebalancing can be useful to improve system performance. However, the basic rebalancing mechanism does not perform rebalancing in these example scenarios. In contrast, a rebalancing component 108 of the storage engine 104 can be utilized to perform rebalancing and move fragments to the n new nodes (e.g., even in a scenario wherein [floor1, ceil1] is the same as [floor2, ceil2]). In an aspect, the rebalancing component 108 can determine the number of fragments of a data portion that can be moved (l), based on the following equation:

$$l=(k+m)/N2*n \qquad (5)$$

According to an embodiment, the rebalancing component 108 can allocate new capacity for the fragments that are to be moved within the newly added nodes and move the fragments to the newly added nodes. The fragments that remain in the old nodes are not moved inside the old nodes.

It is noted that oftentimes the number of fragments that can be moved (l), calculated based on equation (5), is not an integer value. A simple solution is to use floor(l) or ceil(l) instead of l. However, this would result in a disbalance at the system level (the basic mechanism fails in this scenario). To prevent the disbalance, the rebalancing component 108 can utilize floor(l) instead of l and additionally accumulate reminders l–floor(l). When accumulated reminders reach or exceed 1, ceil(l) fragments are moved for a current data portion to new node(s), after which a value of accumulated reminders is decreased by 1. Accordingly, the rebalancing component 108 allows to achieve a balance at the system level for cases when l (e.g., determined by equation 5) is not an integer value.

When deciding the fragments that are to be moved from the old/existing nodes to the new nodes, fragment type (data/coding) can be ignored. In one aspect, the rebalancing component 108 can initially move fragments from the nodes that have ceil1 fragments onboard. At the beginning, only one fragment can be moved from such nodes. If after each such node has provided a fragment to move, and there is still a need to move more fragments, nodes with floor1 fragments onboard donate their fragments. It is noted that most any technique (e.g., based on operator policy and/or preference) can be used to choose what nodes are to be offloaded (e.g. 3 fragments need to be moved from 5 nodes). For example, a capacity-based technique can be utilized, wherein nodes having less amount of available capacity (e.g., less than a defined threshold, less than the other nodes, etc.) are given a higher priority for offloading fragments.

Further, the rebalancing component 108 can perform the disclosed rebalancing process at most any time, for example, on receiving an authorization (e.g., from a network operator), automatically in response to an event (e.g., addition of nodes), at a defined time, etc. In one aspect, the disclosed rebalancing process can be performed while the data storage cluster 102 is running and/or servicing requests. For example, clients (not shown) can read and write to the data storage nodes 106 and the fragments can be moved concurrently in the background.

In one example, system 100 can be part of most any object storage system such as, but not limited to, a Dell EMC® Elastic Cloud Storage (ECS™). It is noted that the data storage nodes 106 can comprise volatile memory(s) or nonvolatile memory(s), or can comprise both volatile and nonvolatile memory(s). Examples of suitable types of volatile and non-volatile memory are described below with reference to FIG. 12. The memory (e.g., data stores, databases) of the subject systems and methods is intended to comprise, without being limited to, these and any other suitable types of memory. Although systems and methods disclosed describe a scale-out architecture, it is noted that the subject specification is not limited to scale-out architectures and can be applied to scale-up architecture as well.

Figure 2:
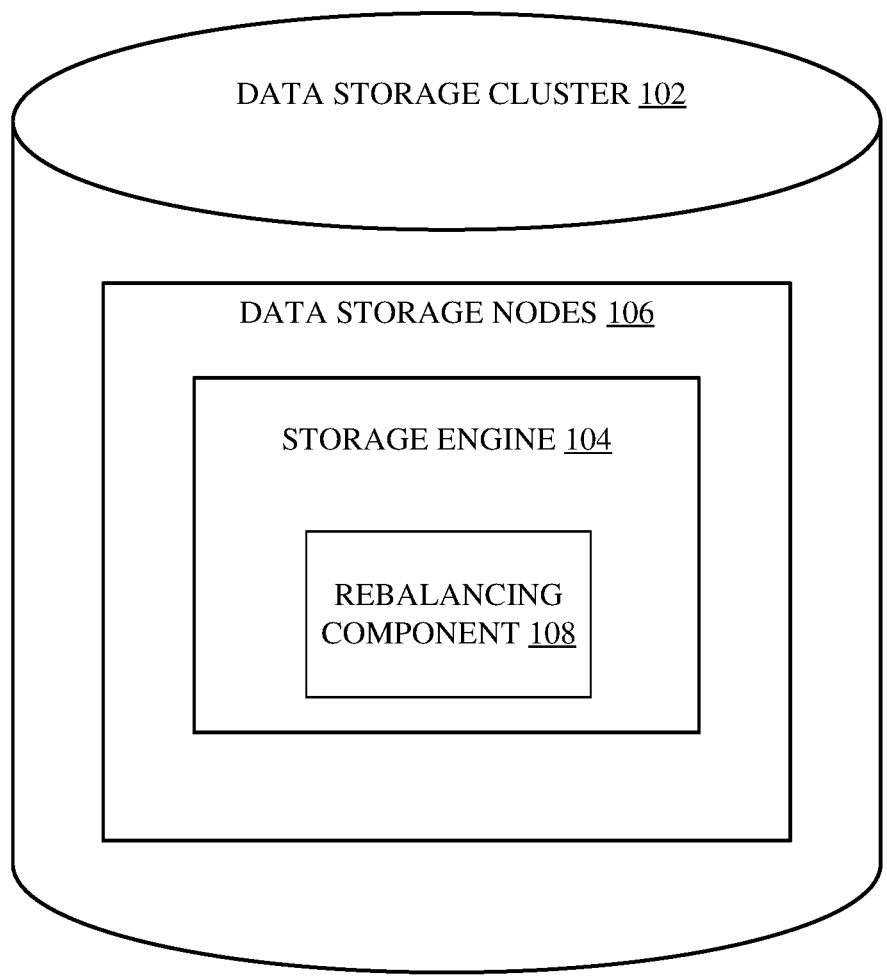
FIG. 2 illustrates an example block diagram of a data storage cluster comprising a data storage engine that facilitates efficient data rebalancing.

FIG. 2 illustrates a block diagram of a data storage cluster 102 comprising a storage engine 104 that facilitates efficient data rebalancing, in accordance with various example embodiments. The storage engine 104 can be a part of a storage service layer (e.g., storage services illustrated by FIG. 11) of the cloud-based data storage system, and can handle data availability and protection against data corruption, hardware failure(s), and/or data center disasters. In embodiment(s), the storage engine 104 can be a distributed, shared service, storage service, etc. that can run on each node, ECS node, etc., e.g., within a group of data storage nodes 106 of a data storage cluster 102, e.g., an ECS cluster illustrated by FIG. 11, and can manage transactions and persists data to respective nodes.

As an example, the storage engine 104 can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed, closed, etc. In this regard, content of a sealed, closed, etc. chunk is immutable, e.g., read-only, and after the chunk is closed, the storage engine performs erasure-coding on the chunk.

FIG. 2 illustrates an embodiment wherein the storage engine 104 and rebalancing component 108 are within one or more of the data storage nodes 106. As an example, the data storage cluster 102, the storage engine 104, the data storage nodes 106, and the rebalancing component 108 can comprise functionality as more fully described herein, for example, as described above with regard to system 100.

Referring now to FIGS. 3-9, there illustrated are example systems 300-900 that depict efficient data rebalancing when a data storage cluster is scaled out (e.g., due to the addition of new racks or storage nodes), according to an aspect of the specification. Moreover, systems 300-900 depict an example scenario wherein fragments are moved from existing nodes to newly added nodes. However, it is noted that the subject specification is not limited to rebalancing when nodes are added and that the rebalancing can be performed, based on the embodiments described herein, at other times, such as but not limited to, when the system is determined to be imbalanced, when one or more nodes are removed from the data storage cluster, etc.

Figure 3:
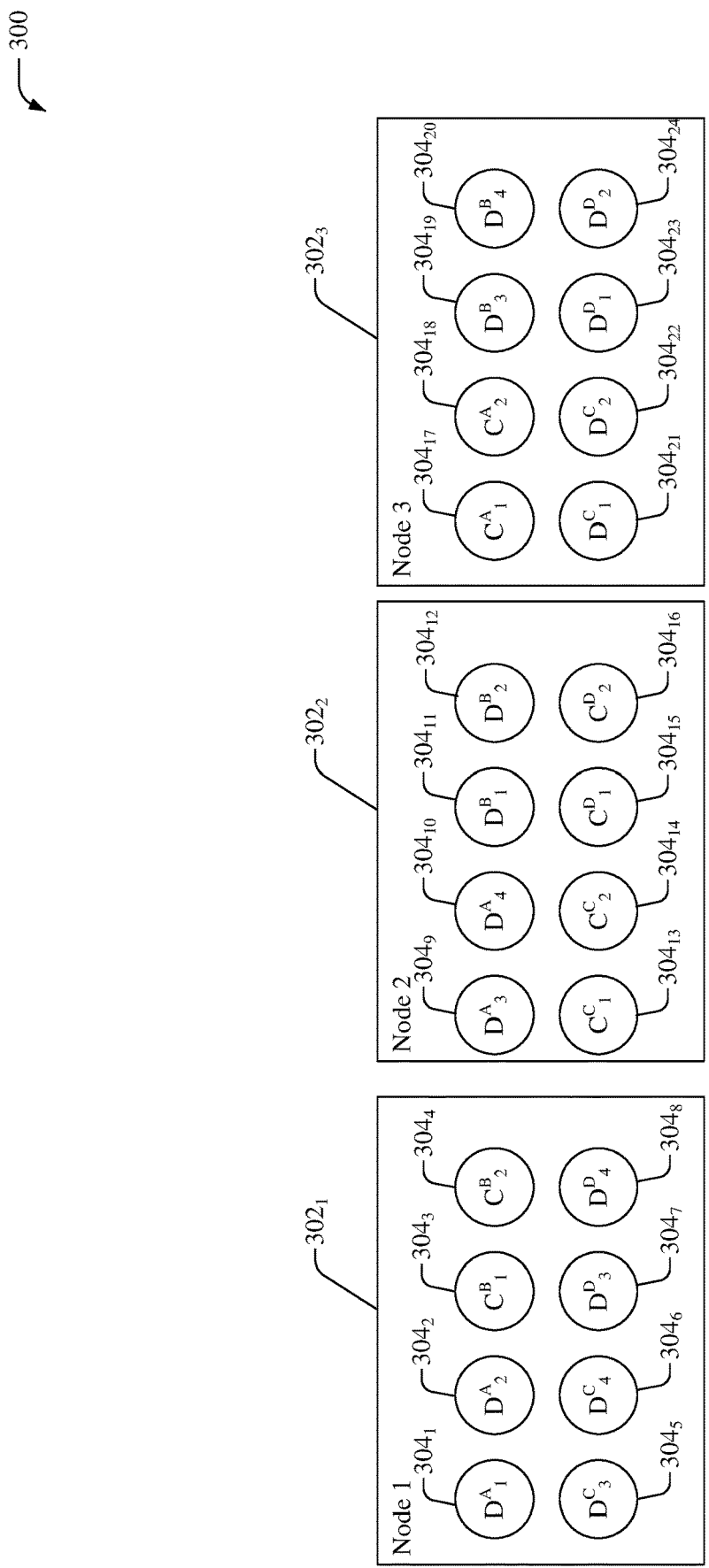
FIG. 3 illustrates an example system comprising a data storage cluster having an initial configuration of three nodes.

FIG. 3 illustrates an example system 300 comprising a data storage cluster having an initial configuration of three nodes, Node 1-Node 3 ($302_1$-$302_3$). As an example, the nodes $302_1$-$302_3$ can be substantially similar to data storage nodes 106 and can comprise functionality as more fully described herein, for example, as described above with regard to data storage nodes 106. In an aspect, the nodes $302_1$-$302_3$ can store fragments ($304_1$-$304_{24}$) of data portions A, B, C, and D that have been protected using 4+2 (e.g., k=4, m=2) erasure coding configuration (e.g., via the storage engine 104). Moreover, based on the 4+2 erasure coding configuration, each of the data portions A, B, C, and D can be divided into four data fragments (e.g., $D^A_1$-$D^A_4$, $D^B_1$-$D^B_4$, $D^C_1$-$D^C_4$, $D^D_1$-$D^D_4$ respectively) that are encoded to generate two coding fragments for each data portion (e.g., $C^A_1$-$C^A_2$, $C^B_1$-$C^B_2$, $C^C_1$-$C^C_2$, $C^D_1$-$C^D_2$ respectively). It is noted that the subject specification is not limited to a three-node cluster having four data portions that are protected based on a 4+2 erasure coding configuration and most any number of nodes, any number of data portions, and/or erasure coding configuration can be utilized.

Figure 4:
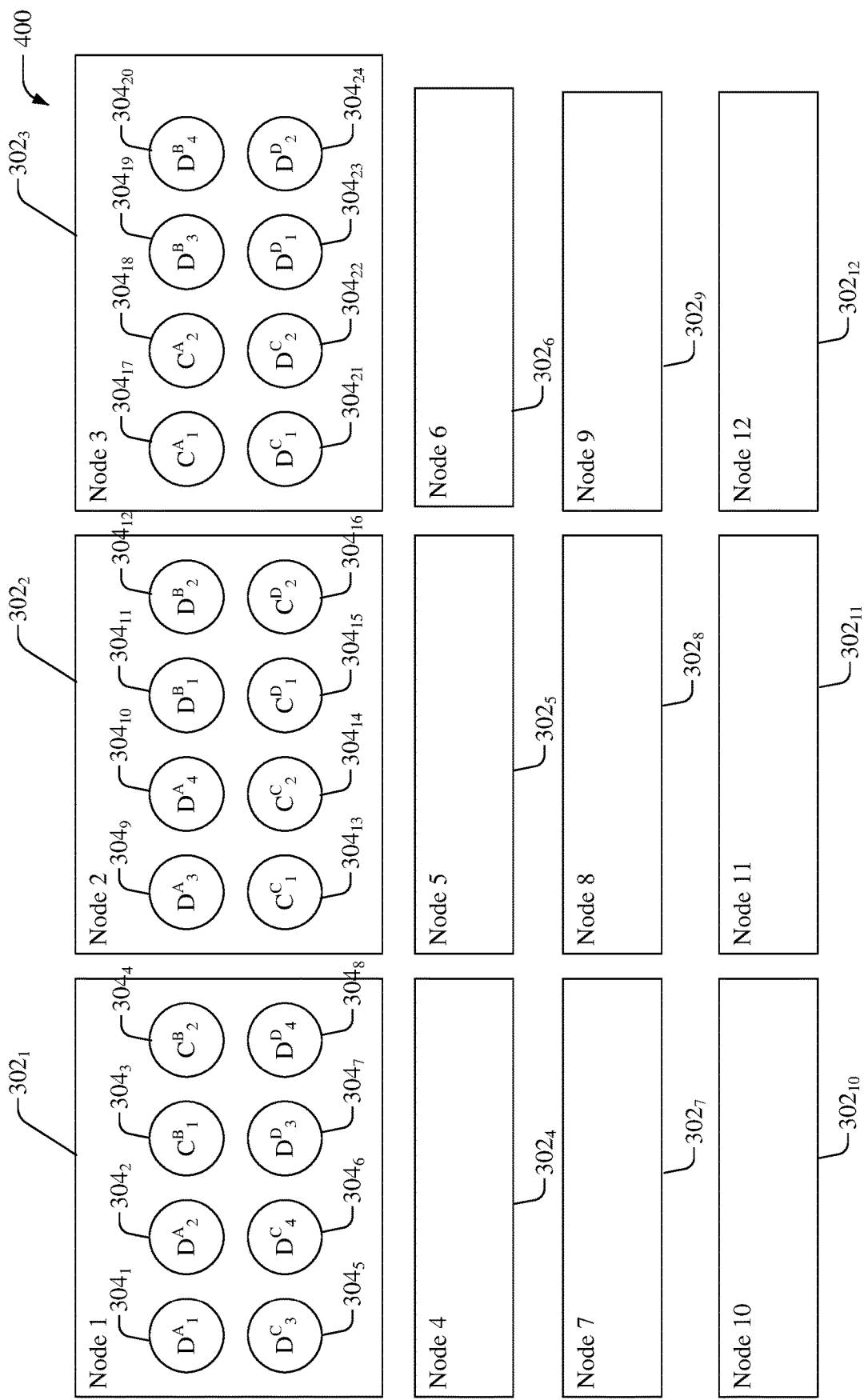
FIG. 4 illustrates an example system that comprises an expanded data storage cluster.

FIG. 4 illustrates an example system 400 that comprises an expanded data storage cluster. In an aspect, nine new nodes, Node 4-Node 12 ($302_4$-$302_{12}$) have been added to the cluster, for example, to increase capacity and/or allow the cluster to accept new data. Nodes $302_4$-$302_{12}$ are substantially similar to nodes $302_1$-$302_3$ and/or data storage nodes 106 and can comprise functionality as more fully described herein, for example, as described above with regard to nodes $302_1$-$302_3$ and/or data storage nodes 106. It is noted that the subject specification is not limited to addition of nine nodes and most any number of nodes can be added to the cluster.

Figure 5:
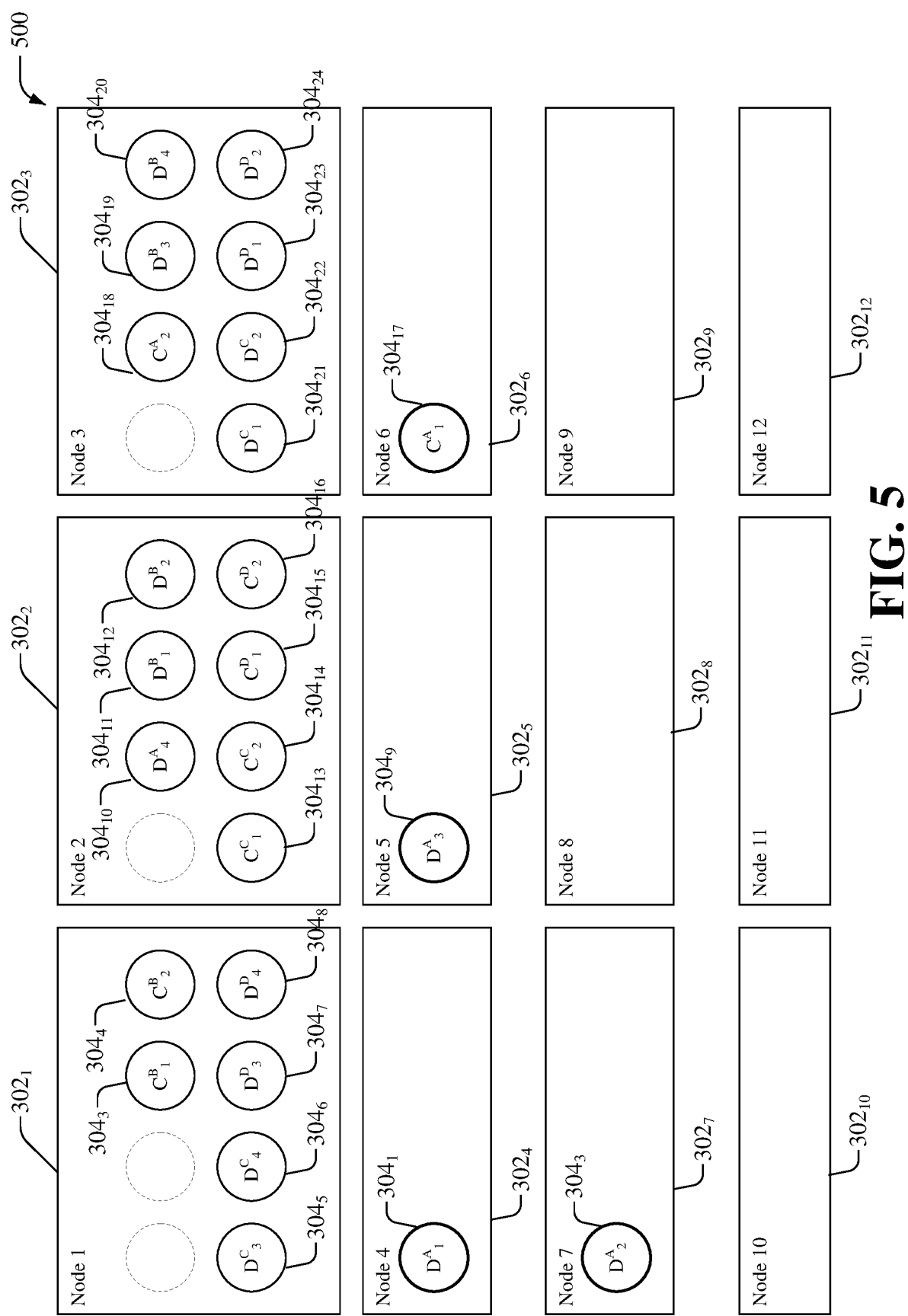
FIG. 5 illustrates an example system that performs rebalancing for a first data portion, according to one or more aspects of the disclosed subject matter.

FIG. 5 illustrates an example system 500 that performs rebalancing for a first data portion (e.g., data portion A). When new nodes $302_4$-$302_{12}$ are added to the cluster, an enhanced rebalancing operation can be performed to improve data availability and/or robustness, as well as increase overall system performance. Existing data and coding fragments of the data portions are distributed between the nodes during rebalancing. In an aspect, the data portions are handled sequentially, one by one. The number of fragments (l) that can be moved from a data portion is determined (e.g., by rebalancing component 108) based on equation (5). In this example scenario, l=(4+2)/12*9=4.5. Accordingly, each protected data portion (e.g., A-D) can transfer 4.5 fragments to the new nodes $302_4$-$302_{12}$. In this example scenario, l is not an integer value and portions (e.g., 0.5 fragment) cannot be transferred, a floor function, floor(l), is utilized to determine the actual number of fragments that are to be moved for the first data portion (e.g., data portion A). For example, floor(4.5) is 4. Thus, four fragments (e.g., data and/or coding fragments) of data portion A are moved to the new nodes $302_4$-$302_{12}$ (e.g., by rebalancing component 108). The individual fragments can be selected in most any manner, for example, randomly, based on operator preferences, based on node capacity and/or load, etc. For example, data fragment $D^A_1$ $304_1$ is moved from Node 1 $302_1$ to Node 4 $302_4$; data fragment $D^A_2$ $304_3$ is moved from Node 1 $302_1$ to Node 7 $302_7$; data fragment $D^A_3$ $304_9$ is moved from Node 2 $302_2$ to Node 5 $302_5$; and coding fragment $C^A_1$ $304_{17}$ is moved from Node 3 $302_3$ to Node 6 $302_6$. Further, the rebalancing component 108 "remembers" that 0.5 fragments still need to be moved. In one example, the rebalancing component 108 can utilize a tracking mechanism, for example, a counter that is incremented with the remainder value (e.g., 0.5 in this example).

Figure 6:
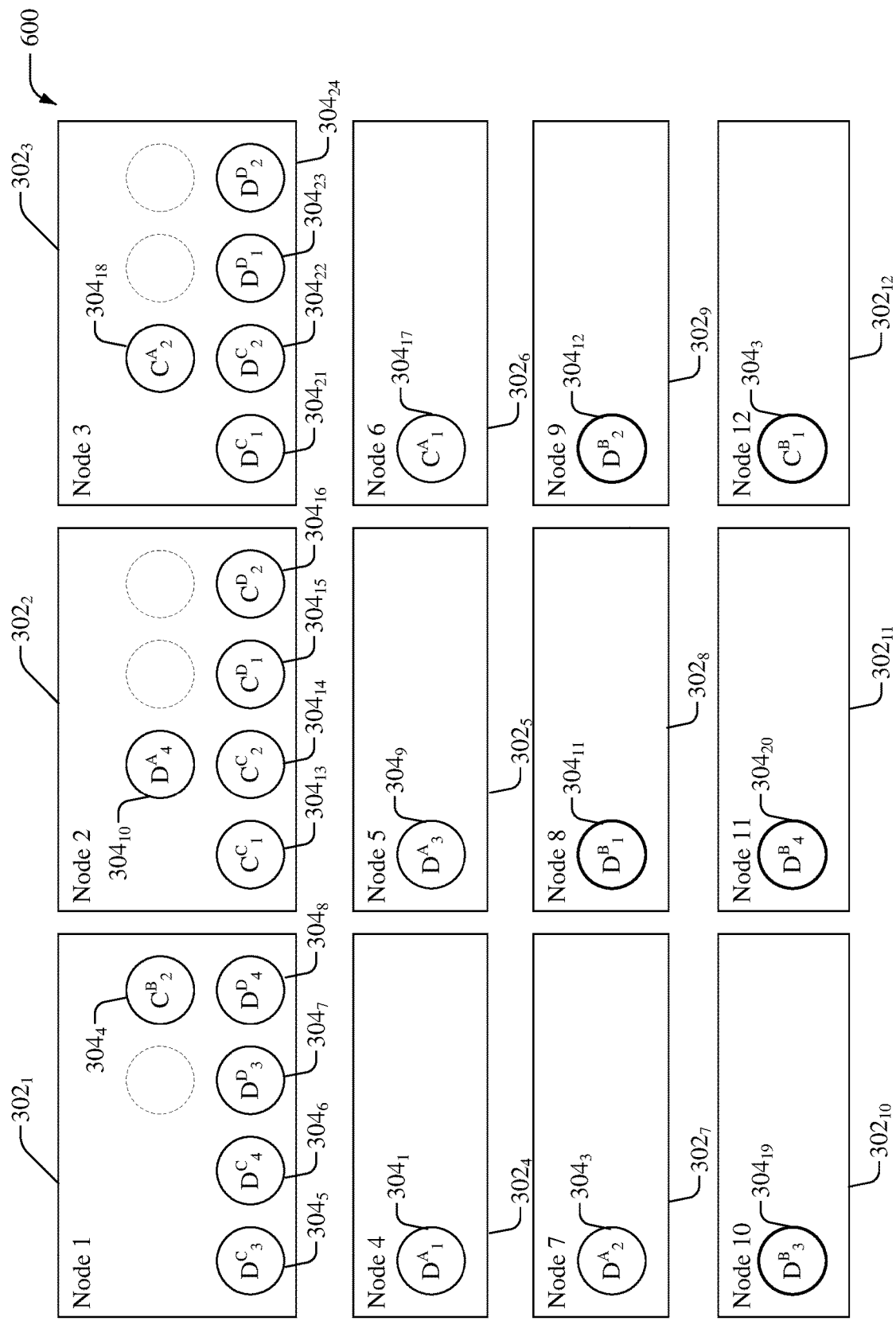
FIG. 6 illustrates an example system that performs rebalancing for a second data portion, according to one or more aspects of the disclosed subject matter.

FIG. 6 illustrates an example system 600 that performs rebalancing for a second data portion (e.g., data portion B). As an example, floor(l) (e.g., floor(4.5)=4) is determined and the counter is incremented with the remainder value (e.g., 0.5). If the counter does not equal (and/or exceed) 1, floor(l) fragments of the second data portion can be moved to the new nodes $302_4$-$302_{12}$. Alternatively, if the counter equals (and/or exceeds) 1, ceil(l) fragments of the second data portion can be moved to the new nodes $302_4$-$302_{12}$. In this example, the counter value equals 1 (e.g., 0.5+0.5), and accordingly, ceil(4.5)=5 fragments of data portion B can be moved to the new nodes $302_4$-$302_{12}$ (e.g., by rebalancing component 108). For example, data fragment $D^B_1$ $304_{11}$ is moved from Node 2 $302_2$ to Node 8 $302_8$; data fragment $D^B_2$ $304_{12}$ is moved from Node 2 $302_2$ to Node 9 $302_9$; data fragment $D^B_3$ $304_{19}$ is moved from Node 3 $302_3$ to Node 10 $302_{10}$; data fragment $D^B_4$ $304_{20}$ is moved from Node 3 $302_3$ to Node 11 $302_{11}$; and coding fragment $C^B_1$ $304_3$ is moved from Node 1 $302_1$ to Node 12 $302_{12}$. The individual fragments can be selected in most any manner, for example, randomly, based on operator preferences, based on node capacity and/or load, etc.

When determined that ceil(l) fragments have been moved, the counter value is decremented by 1 (e.g., by rebalancing component 108). For example, in this case (0.5+0.5)−1. Accordingly, in this example scenario the counter value is zero.

Figure 7:
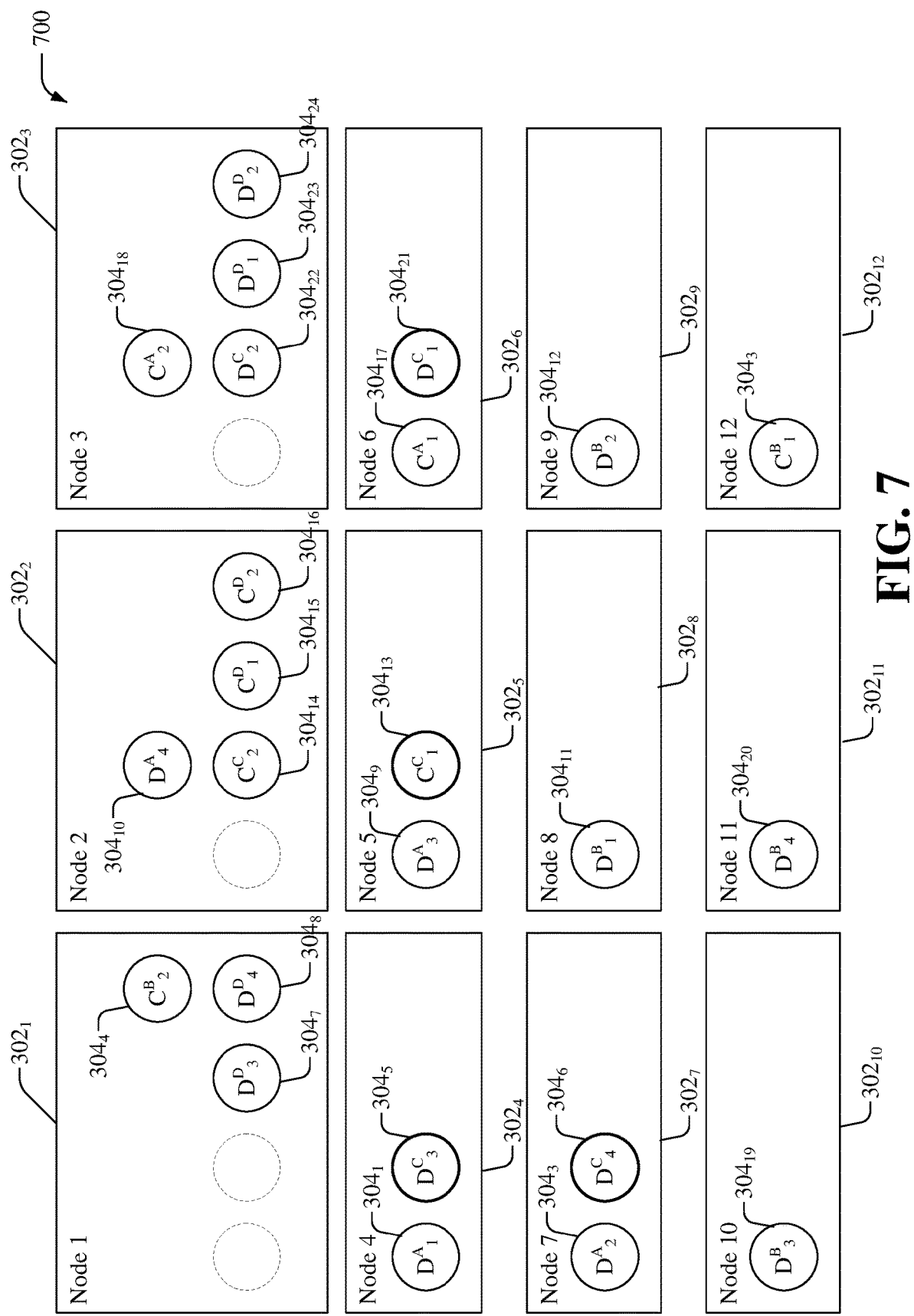
FIG. 7 illustrates an example system that performs rebalancing for a third data portion, according to one or more aspects of the disclosed subject matter.

FIG. 7 illustrates an example system 700 that performs rebalancing for a third data portion (e.g., data portion C). As an example, floor(l) (e.g., floor(4.5)=4) is determined and the counter is incremented with the remainder value (e.g., 0.5). If the counter does not equal (and/or exceed) 1, floor(l) fragments of the third data portion can be moved to the new nodes $302_4$-$302_{12}$. Alternatively, if the counter does not equal (and/or exceed) 1, ceil(l) fragments of the third data portion can be moved to the new nodes $302_4$-$302_{12}$. In this example, the counter value equals 0.5 (e.g., since counter value was decremented by 1 after moving ceil(l) fragments of data portion B), and accordingly, floor(4.5)=4 fragments of data portion C can be moved to the new nodes $302_4$-$302_{12}$ (e.g., by rebalancing component 108). For example, data fragment $D^C_3$ $304_5$ is moved from Node 1 $302_1$ to Node 4 $302_4$; data fragment $D^C_4$ $304_6$ is moved from Node 1 $302_1$ to Node 7 $302_7$; data fragment $D^C_1$ $304_{21}$ is moved from Node 3 $302_3$ to Node 6 $302_6$; and coding fragment $C^C_1$ $304_{13}$ is moved from Node 2 $302_2$ to Node 5 $302_5$. The individual fragments can be selected in most any manner, for example, randomly, based on operator preferences, based on node capacity and/or load, etc. When determined that floor(l) fragments have been moved, the counter value is incremented by the remainder 0.5 (e.g., by rebalancing component 108).

Figure 8:
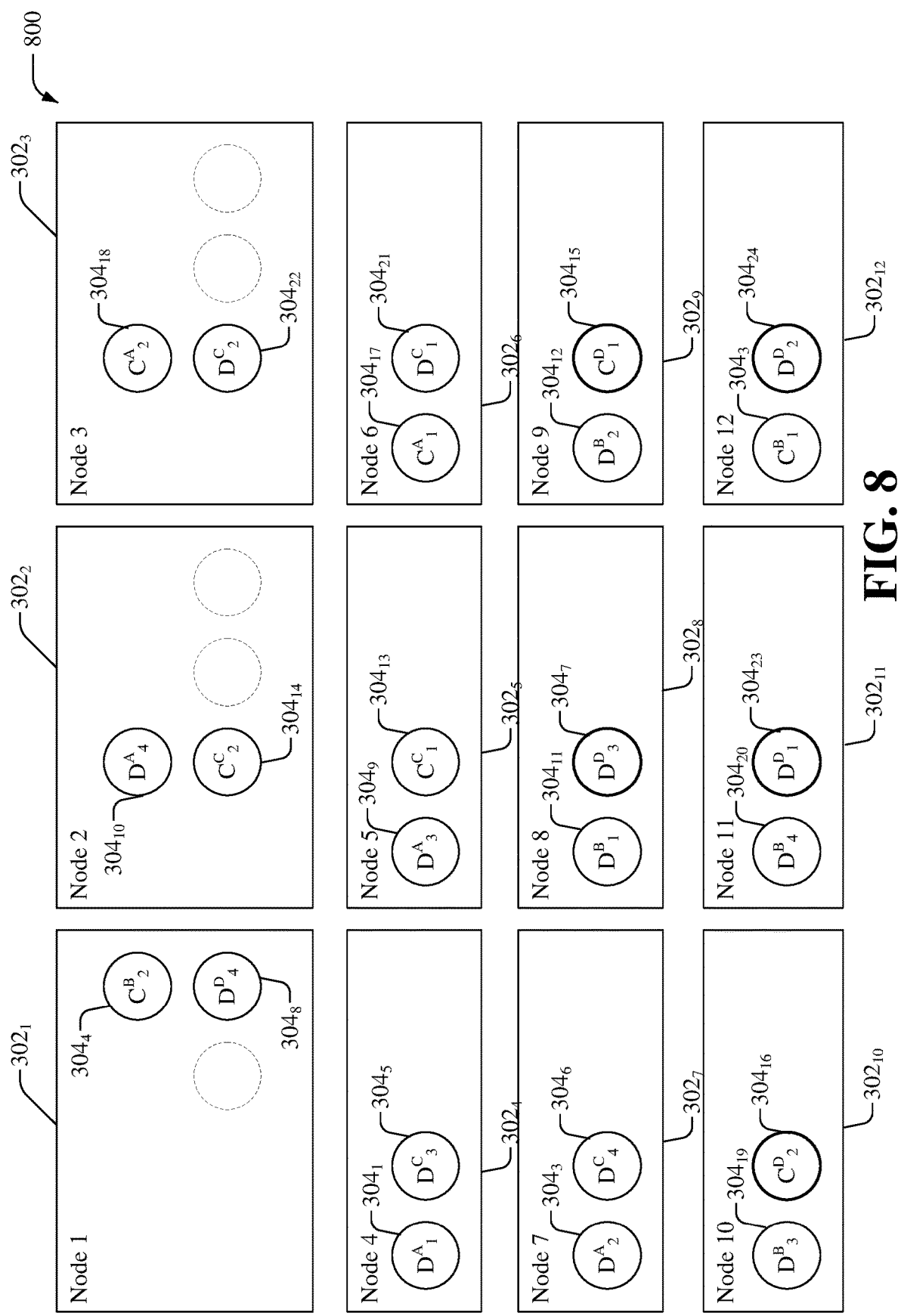
FIG. 8 illustrates an example system that performs rebalancing for a fourth data portion, according to one or more aspects of the disclosed subject matter.

FIG. 8 illustrates an example system 800 that performs rebalancing for a fourth data portion (e.g., data portion D). In one aspect, floor(l) (e.g., floor(4.5)=4) is determined and the counter is incremented with the remainder value (e.g., 0.5). If the counter does not equal (and/or exceed) 1, floor(l) fragments of the fourth data portion can be moved to the new nodes $302_4$-$302_{12}$. Alternatively, if the counter does not equal (and/or exceed) 1, ceil(l) fragments of the fourth data portion can be moved to the new nodes $302_4$-$302_{12}$. In this example, the counter value equals 1 (e.g., 0.5+0.5), and accordingly, ceil(4.5)=5 fragments of data portion D can be moved to the new nodes $302_4$-$302_{12}$ (e.g., by rebalancing component 108). For example, data fragment $D^D_3$ $304_7$ is moved from Node 1 $302_1$ to Node 8 $302_8$; data fragment $D^D_2$ $304_{12}$ is moved from Node 2 $302_2$ to Node 9 $302_9$; data fragment $D^D_1$ $304_{23}$ is moved from Node 3 $302_3$ to Node 11 $302_{11}$; data fragment $D^D_2$ $304_{24}$ is moved from Node 3 $302_3$ to Node 12 $302_{12}$; coding fragment $C^D_1$ $304_{15}$ is moved from Node 2 $302_2$ to Node 9 $302_9$; and coding fragment $C^D_2$ $304_{16}$ is moved from Node 2 $302_2$ to Node 10 $302_{10}$. The individual fragments can be selected in most any manner, for example, randomly, based on operator preferences, based on node capacity and/or load, etc.

Figure 9:
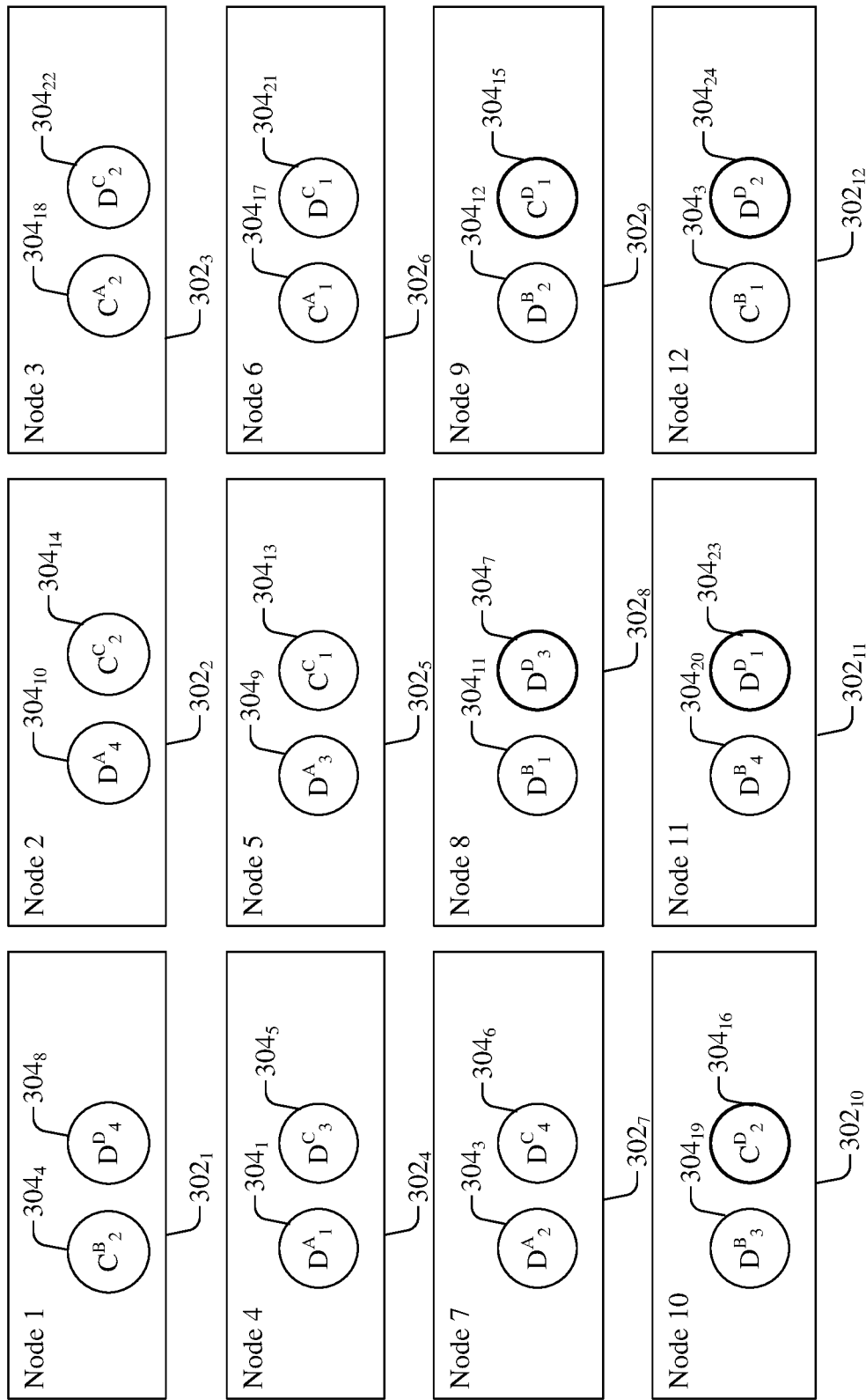
FIG. 9 illustrates an example system that depicts a final layout of erasure coded fragments after a rebalancing operation has been performed.

FIG. 9 illustrates an example system 900 that depicts a final layout of erasure coded fragments after a data rebalancing operation has been performed. In one aspect, each of the nodes $302_1$-$302_{12}$ stores two fragments, which is within the range [floor1, ceil1] (e.g., [2,2]) that is calculated from equations (1) and (2). It is noted that the subject specification is not limited to the above described sequence (e.g., in systems 300-800) of moving fragments. For example, the rebalancing component 108 can determine all the fragments that are to be moved, allocate capacity for the fragments in the new nodes $302_4$-$302_{12}$, and then move the fragments in most any order, in parallel, concurrently, at a specified time, in response to an event, etc.

Figure 10A:
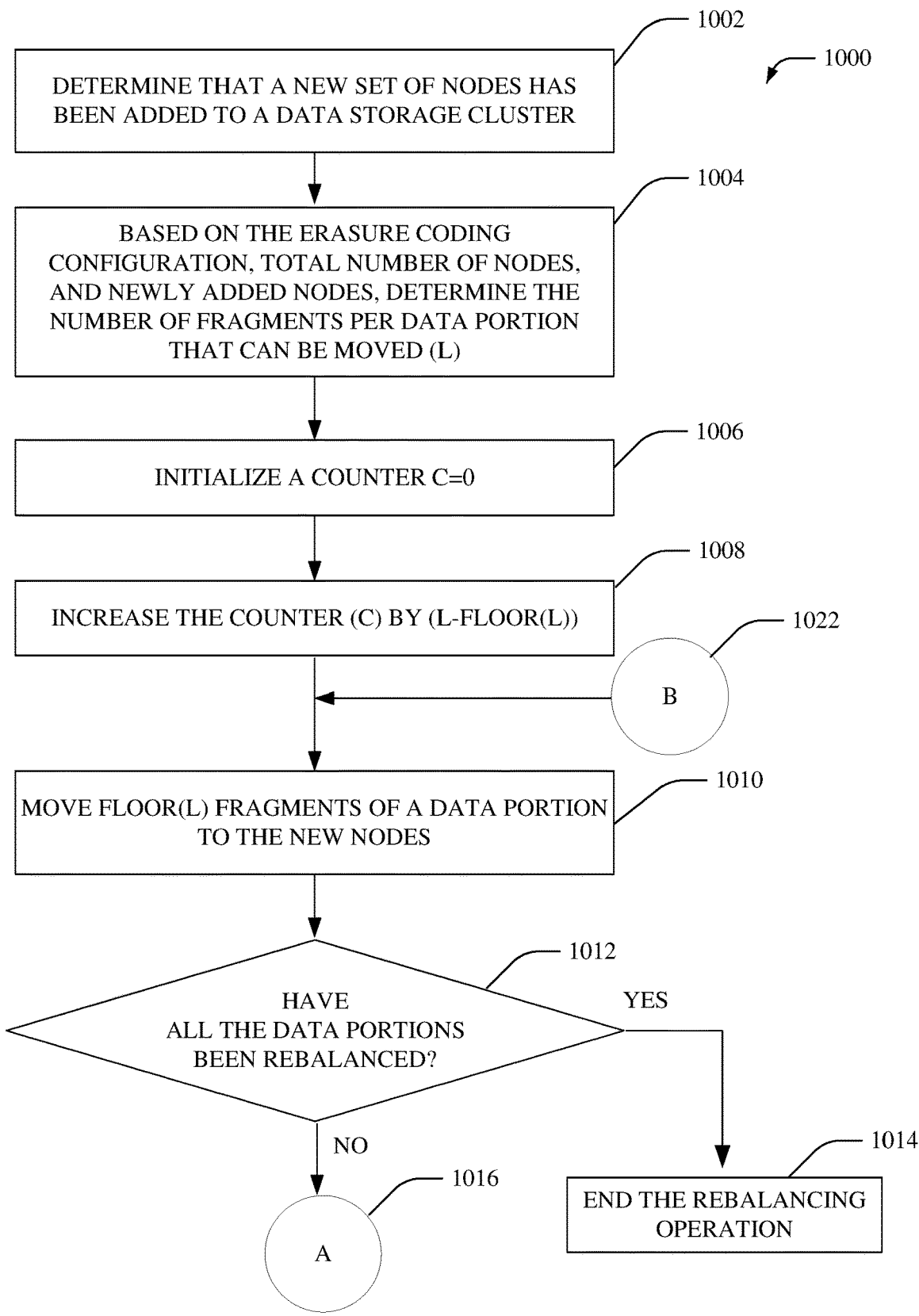
FIGS. 10A-10B illustrate example methods that facilitate uniform and/or efficient storage space utilization subsequent to expansion of a data storage cluster.
Figure 10B:
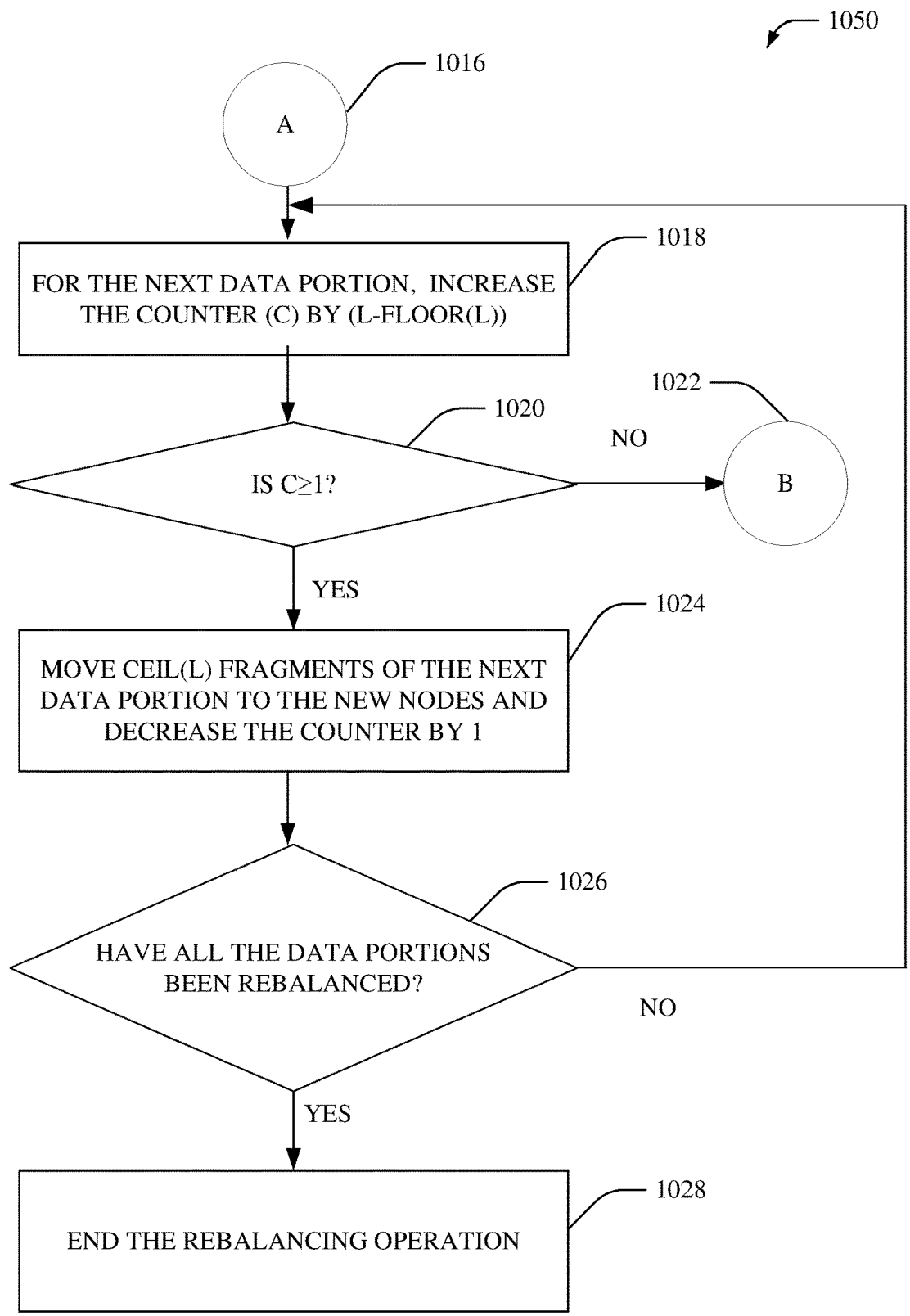

FIGS. 10A-10B illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

FIGS. 10A-10B illustrate example methods (1000,1050) that facilitate uniform and/or efficient storage space utilization subsequent to expansion of a data storage cluster, according to an aspect of the subject disclosure. According to an aspect, the methods (1000,1050) can be implemented by one or more nodes of a distributed cloud storage system. The methods (1000,1050) can provide a universal approach for data rebalancing that improves data availability/robustness and overall system performance. Moreover, the methods (1000,1050) enable rebalancing even in scenarios wherein a number of old nodes is significantly greater than a number of new nodes (or vice versa), a number of fragments that are to be stored per node does not reduce with a transition to the new layout, etc.

At 1002, it can be determined that a new set of nodes is added to a data storage cluster. As an example, the data storage cluster can be scaled-out to increase capacity. At 1004, a number of fragments (l) per data portion that can be moved from the old nodes to the new nodes can be determined, based on the erasure coding configuration (e.g., values for k and m), total number of nodes (after scaling-out), and the number of newly added nodes (See equation (5)). At 1006, a counter, C, can be initialized (e.g., set C=0). At 1008, the counter value can be incremented by 1−floor(l) (e.g., C=C+(1−floor(l)) and at 1010, floor(l) fragments of a data portion can be moved to the new nodes. The floor function, floor(x), provides the greatest integer that is less than or equal to x.

At 1012, it can be verified whether all the data portions (e.g., chunks) stored within the data storage cluster have been rebalanced (e.g., data fragments of all the data portions have been moved to the new nodes). If determined that all the data portions have been rebalanced, then the rebalancing operation can end at 1014. Alternatively, if determined that all the data portions have not been rebalanced, then the rebalancing operation can proceed to handle the next data portion at 1016 as shown in FIG. 10B.

At 1018, the counter (C) can be increased by 1−floor(l) (e.g., C=C+(1−floor(l)). At 1020, it can be determined if the value of C is greater that or equal to 1. If determined that C<1, then the method can continue at 1022, as shown at FIG. 10A and floor(l) fragments of a data portion can be moved to the new nodes. Alternatively, if determined that C≥1, then at 1024, ceil(l) fragments of the next data portion can be moved to the new nodes and the counter value can decreased by 1 (e.g., C=C−1). The ceiling function, ceil(x), provides the least integer that is greater than or equal to x.

At 1026, it can be verified whether all the data portions (e.g., chunks) stored within the data storage cluster have been rebalanced (e.g., data fragments of all the data portions have been moved to the new nodes). If determined that all the data portions have been rebalanced, then the rebalancing operation can end at 1028. Alternatively, if determined that all the data portions have not been rebalanced, then the rebalancing operation can proceed to handle the next data portion at 1018. According to an aspect, the redistribution of erasure coded fragments can be performed as a background task so that the chunk data is accessible during the redistribution process. In addition, the fragment data is distributed/transferred as a low priority to minimize network bandwidth consumption.

Figure 11:
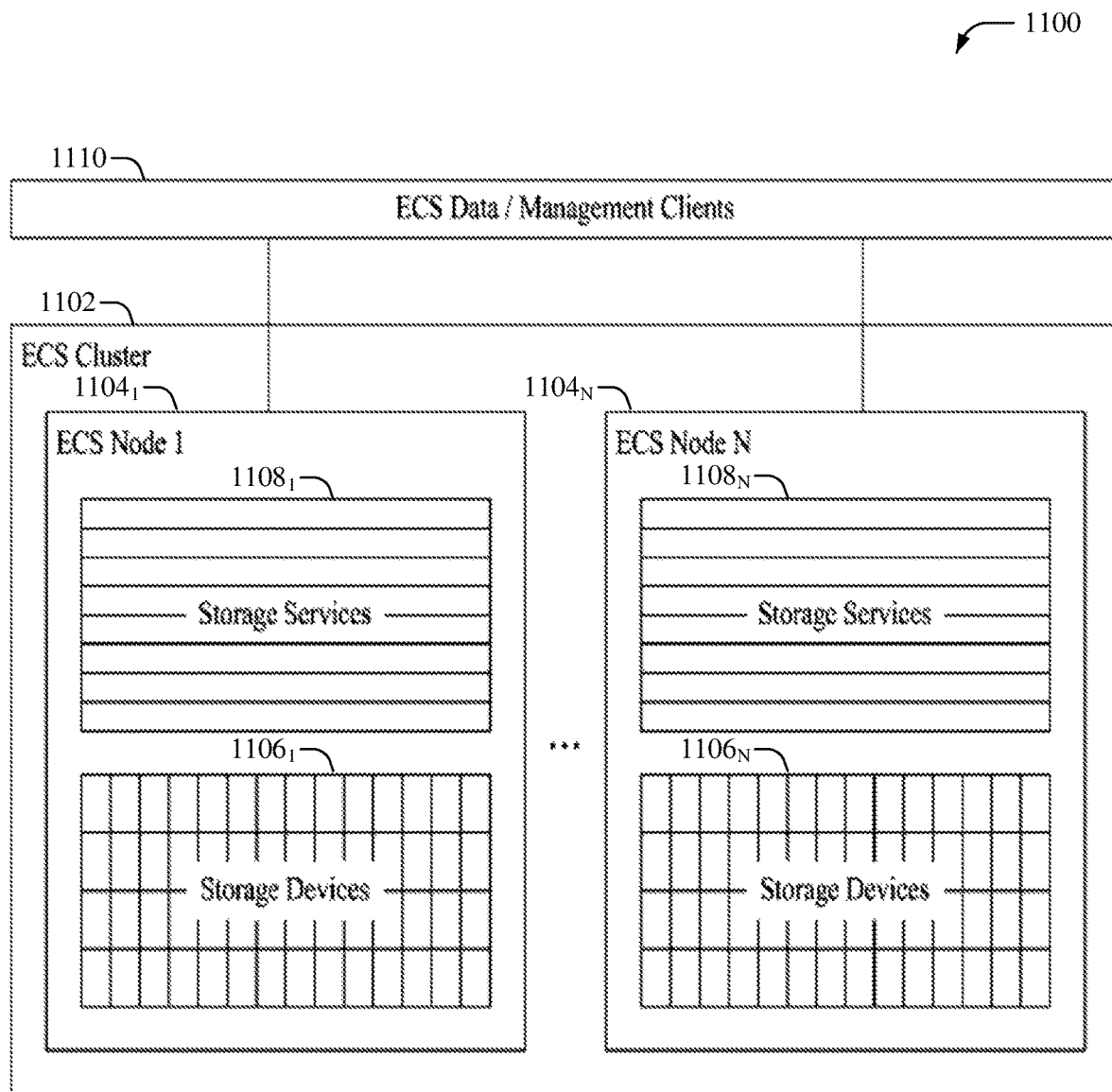
FIG. 11 illustrates high-level architecture of an Elastic Cloud Storage (ECS™) cluster that employs efficient data rebalancing.

FIG. 11 illustrates an example high-level architecture 1100 of an ECS™ cluster, according to an aspect of the subject disclosure. ECS™ can comprise a software-defined, cloud-scale, object storage platform that combines the cost advantages of commodity infrastructure with the reliability, availability and serviceability of traditional arrays. With ECS™, an organization can deliver scalable and simple public cloud services with the reliability and control of a private-cloud infrastructure. ECS™ provides comprehensive protocol support for unstructured (object and/or file) workloads on a single, cloud-scale storage platform. In an aspect, the ECS™ cluster 1102 can comprise multiple nodes $1104_1$-$1104_N$, wherein N is most any integer. It is noted that in one or more non-limiting embodiments, the nodes described herein (e.g., data storage nodes 106, Node 1 ($302_1$)-Node 12 ($302_{12}$)) and can be substantially similar to nodes $1104_1$-$1104_N$ and can comprise functionality as more fully described herein, for example, as described above with regard to nodes $1104_1$-$1104_N$. The nodes $1104_1$-$1104_N$ can comprise storage devices (e.g. hard drives) $1106_1$-$1106_N$ and can run a set of services $1108_1$-$1108_N$. For example, single node that runs ECS™ version 3.0 can manage 20 independent services. Further, ECS™ data/management clients 1110 can be coupled to the nodes $1104_1$-$1104_N$.

The ECS™ cluster 1102 does not protect user data with traditional schemes like mirroring or parity protection. Instead, the ECS™ cluster 1102 utilizes a k+m erasure coding protection configuration, wherein a data block is divided into k data fragments and m coding fragments are created (e.g., by encoding the k data fragments). Encoding is performed in a manner such that the cluster 1102 can tolerate the loss of any m fragments.

Figure 12:
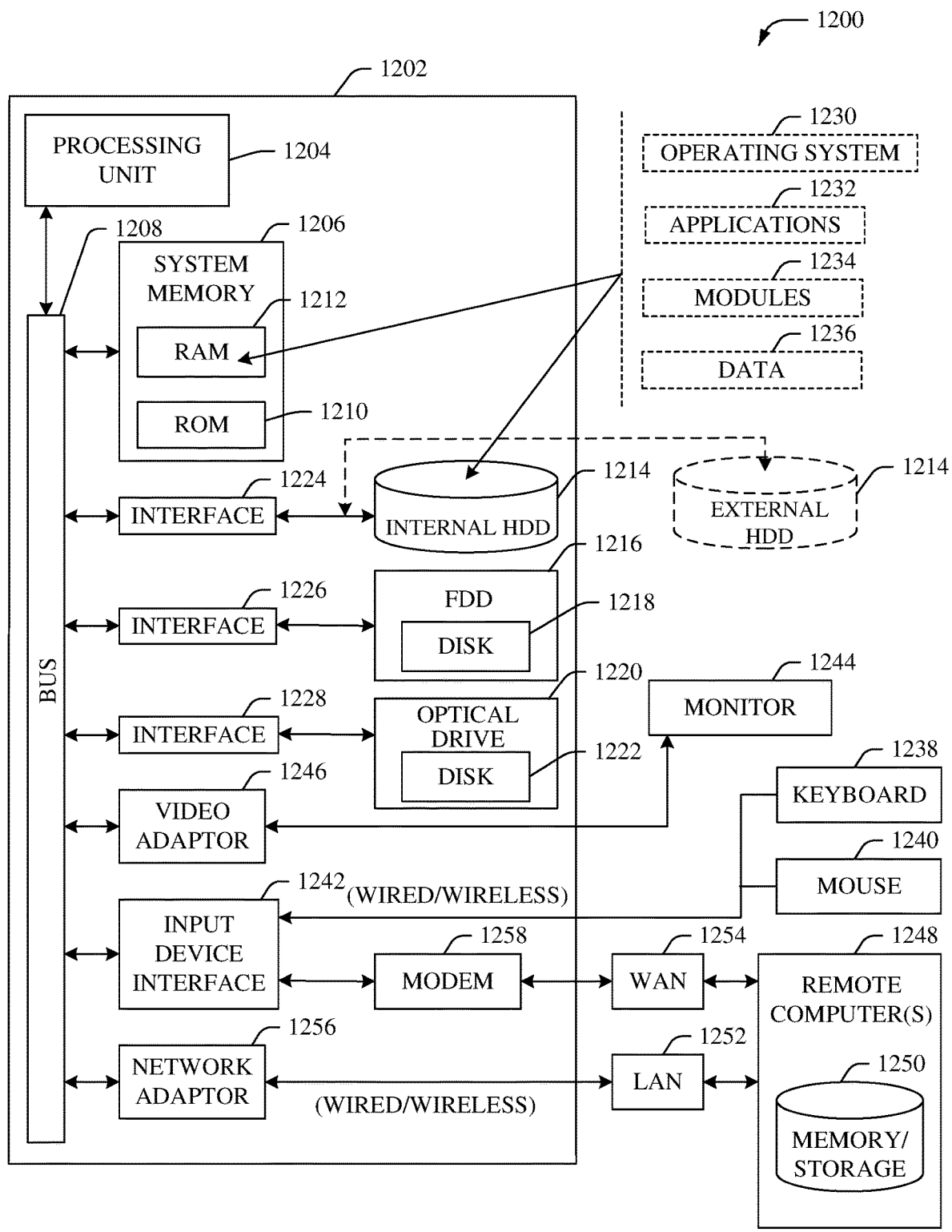
FIG. 12 illustrates a block diagram of an example computer operable to execute the disclosed distributed storage system architecture.

Referring now to FIG. 12, there is illustrated a block diagram of a computer 1202 operable to execute the disclosed storage architecture. In order to provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types.

Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 12, the example environment 1200 for implementing various aspects of the specification comprises a computer 1202, the computer 1202 comprising a processing unit 1204, a system memory 1206 and a system bus 1208. As an example, the component(s), server(s), node(s), cluster(s), system(s), driver(s), module(s), agent(s), engine(s), zone(s) and/or device(s) disclosed herein with respect to systems 100-800 can each comprise at least a portion of the computer 1202. The system bus 1208 couples system components comprising, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 comprises read-only memory (ROM) 1210 and random access memory (RAM) 1212. A basic input/output system (BIOS) is stored in a non-volatile memory 1210 such as ROM, EPROM, EEPROM, which BIOS comprises the basic routines that help to transfer information between elements within the computer 1202, such as during startup. The RAM 1212 can also comprise a high-speed RAM such as static RAM for caching data.

The computer 1202 further comprises an internal hard disk drive (HDD) 1214, which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can comprise computer-executable instructions for performing the methods of the specification.

A number of program modules can be stored in the drives and RAM 1212, comprising an operating system 1230, one or more application programs 1232, other program modules 1234 and program data 1236. All or portions of the operating system, applications, modules, and/or data can also be cached in the RAM 1212. It is noted that the specification can be implemented with various commercially available operating systems or combinations of operating systems.

A user can enter commands and information into the computer 1202 through one or more wired/wireless input devices, e.g., a keyboard 1238 and/or a pointing device, such as a mouse 1240 or a touchscreen or touchpad (not illustrated). These and other input devices are often connected to the processing unit 1204 through an input device interface 1242 that is coupled to the system bus 1208, but can be connected by other interfaces, such as a parallel port, an IEEE 1394 serial port, a game port, a USB port, an infrared (IR) interface, etc. A monitor 1244 or other type of display device is also connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically comprises many or all of the elements described relative to the computer 1202, although, for purposes of brevity, only a memory/storage device 1250 is illustrated. The logical connections depicted comprise wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also comprise a wireless access point disposed thereon for communicating with the wireless adapter 1256.

When used in a WAN networking environment, the computer 1202 can comprise a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It is noted that the network connections shown are example and other means of establishing a communications link between the computers can be used.

The computer 1202 is operable to communicate with any wireless devices or entities operatively disposed in wireless communication, e.g., desktop and/or portable computer, server, communications satellite, etc. This comprises at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that comprise both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) comprising a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this can comprise the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server,"

"node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      determining that a data storage cluster comprising a first set of nodes is expanded by addition of a second set of nodes, wherein the first set of nodes stores erasure-coded fragments associated with chunks;
      determining a non-integer value representing a portion of the erasure-coded fragments per chunk that are to be transferred from the first set of nodes to the second set of nodes;
      facilitating a transfer of a first set of the erasure-coded fragments per chunk from the first set of nodes to the second set of nodes, wherein the first set of the erasure-coded fragments is determined to satisfy a defined floor criterion associated with the non-integer value;
      subsequent to the facilitating, determining an aggregated remainder based on combining remainder values per chunk, wherein the remainder values that have been determined based on subtracting a cardinality of the first set from the non-integer value; and
      in response to determining that the aggregated remainder satisfies a defined remainder criterion, facilitating a transmission of a second set of the erasure-coded fragments per chunk from the first set of nodes to the second set of nodes, wherein the second set of the erasure-coded fragments is determined to satisfy a defined ceiling criterion associated with the non-integer value.

2. The system of claim 1, wherein a number of the erasure-coded fragments within the first set of the erasure-coded fragments is determined based on a greatest integer value that is less than the non-integer value.

3. The system of claim 1, wherein a number of the erasure-coded fragments within the second set of the erasure-coded fragments is determined based on a lowest integer value that is greater than the non-integer value.

4. The system of claim 1, wherein the determining that the aggregated remainder satisfies the defined remainder criterion comprises determining that the aggregated remainder is greater than or equal to 1.

5. The system of claim 4, wherein the operations further comprise:
   in response to the facilitating the transmission of the second set of the erasure-coded fragments, decrementing the aggregated remainder.

6. The system of claim 1, wherein the determining the non-integer value comprises determining the non-integer value based on an erasure coding configuration utilized by the data storage cluster, a number of nodes within the second set of nodes, and a total number of nodes within the first set of nodes and the second set of nodes.

7. The system of claim 1, wherein the transfer of the first set of the erasure-coded fragments is performed as a background process.

8. The system of claim 1, wherein the first set of the erasure-coded fragments are selected from a portion of the first set of nodes that are determined to satisfy a defined capacity criterion.

9. The system of claim 1, wherein the first set of the erasure-coded fragments are selected from a portion of the first set of nodes that are determined to satisfy a defined priority criterion.

10. A method, comprising:
subsequent to a first group of nodes being added to a data storage cluster comprising a second group of nodes that stores erasure-coded fragments associated with chunks, determining, by a system comprising a processor, a non-integer value representing the erasure-coded fragments that are to be transferred from the second group of nodes to the first group of nodes per chunk;
based on applying a floor function to the non-integer value, determining, by the system, a first number of the erasure-coded fragments of a first group of the chunks that are to be transferred from the second group of nodes to the first group of nodes;
accumulating, by the system, remainder values associated with the first group of the chunks, wherein the remainder values have been determined based on subtracting the first number from the non-integer value, and wherein the accumulating results in an accumulated remainder value; and
in response to determining that the accumulated remainder value satisfies a defined remainder criterion, determining, by the system, a second number of the erasure-coded fragments of a second group of the chunks that are to be transferred from the second group of nodes to the first group of nodes, wherein the second number is determined based on applying a ceiling function to the non-integer value.

11. The method of claim 10, further comprising:
directing, by the system, the first number of the erasure-coded fragments from the second group of nodes to the first group of nodes.

12. The method of claim 10, further comprising:
directing, by the system, the second number of the erasure-coded fragments from the second group of nodes to the first group of nodes.

13. The method of claim 12, further comprising:
in response to the directing, decreasing, by the system, the accumulated remainder value.

14. The method of claim 13, wherein decreasing comprises decreasing the accumulated remainder value by 1.

15. The method of claim 10, wherein the determining that the accumulated remainder value satisfies the defined remainder criterion comprises determining that the accumulated remainder value is greater than or equal to 1.

16. The method of claim 10, wherein the determining the non-integer value comprises determining the non-integer value based on an erasure coding configuration utilized by the data storage cluster, a number of nodes within the first group of nodes, and a total number of nodes within the first group of nodes and the second group of nodes.

17. A computer-readable storage medium comprising instructions that, in response to execution, cause a system comprising a processor to perform operations, comprising:
subsequent to a first group of nodes being added to a data storage cluster comprising a second group of nodes that stores erasure-coded fragments associated with chunks, determining a value associated with the erasure-coded fragments that are to be transferred from the second group of nodes to the first group of nodes per chunk;
in response to determining that the value is not an integer value, determining, based on applying a floor function to the value, a first number of the erasure-coded fragments of a first group of the chunks that are to be transferred from the second group of nodes to the first group of nodes;
aggregating remainder values associated with the first group of the chunks to generate an aggregated remainder value, wherein the remainder values are determined based on reducing the value by the first number; and
in response to determining that the aggregated remainder value satisfies a defined remainder criterion, determining a second number of the erasure-coded fragments of a second group of the chunks that are to be transferred from the second group of nodes to the first group of nodes, wherein the second number is determined based on applying a ceiling function to the value.

18. The computer-readable storage medium of claim 17, wherein the operations further comprise:
initiating a transfer of the first number of the erasure-coded fragments from the second group of nodes to the first group of nodes.

19. The computer-readable storage medium of claim 17, wherein the operations further comprise:
initiating a transfer of the second number of the erasure-coded fragments from the second group of nodes to the first group of nodes; and
subsequent to the transfer, decreasing the aggregated remainder value.

20. The computer-readable storage medium of claim 17, wherein the data storage cluster is part of an object storage system that employs a microservices architecture pattern.

* * * * *